(12) United States Patent
Negre

(10) Patent No.: US 7,950,082 B2
(45) Date of Patent: May 31, 2011

(54) CRADLE ADAPTABLE TO AN AIRCRAFT SEAT

(75) Inventor: Gilles Negre, Le Plessis-Belleville (FR)

(73) Assignee: TMC Holding, Paris (FR)

( * ) Notice: Subject to any disclaimer, the term of this patent is extended or adjusted under 35 U.S.C. 154(b) by 0 days.

(21) Appl. No.: 12/596,142

(22) PCT Filed: Feb. 15, 2008

(86) PCT No.: PCT/FR2008/000522
§ 371 (c)(1),
(2), (4) Date: Oct. 15, 2009

(87) PCT Pub. No.: WO2008/142294
PCT Pub. Date: Nov. 27, 2008

(65) Prior Publication Data
US 2010/0107331 A1    May 6, 2010

(30) Foreign Application Priority Data

Apr. 16, 2007 (FR) .................................. 07 02728

(51) Int. Cl.
*A47D 7/04* (2006.01)
(52) U.S. Cl. ............. 5/94; 5/93.2; 5/102; 5/655; 5/98.3; 244/118.6

(58) Field of Classification Search ...................... 5/93.2, 5/94, 98.1, 98.3, 102, 120, 122, 655; 244/118.6
See application file for complete search history.

(56) References Cited

U.S. PATENT DOCUMENTS

| | | | | |
|---|---|---|---|---|
| 1,664,958 A * | 4/1928 | Zeiser | ............ | 297/335 |
| 1,885,493 A | 11/1932 | Tyler | | |
| 2,691,177 A * | 10/1954 | Leonard | ............. | 5/98.3 |
| 2,724,427 A | 11/1955 | McCarson | ............. | 155/45 |
| 2,805,704 A * | 9/1957 | Avseev | ................ | 297/8 |
| 2,949,628 A * | 8/1960 | Koltun | ................. | 16/335 |
| 3,096,917 A * | 7/1963 | Gudiksen | .......... | 294/140 |
| 3,735,430 A * | 5/1973 | Platz | ................. | 5/118 |
| 4,010,880 A * | 3/1977 | Guillot-Munoz | ........ | 224/275 |

FOREIGN PATENT DOCUMENTS

DE    10 79 292    4/1960

* cited by examiner

*Primary Examiner* — Michael Trettel
(74) *Attorney, Agent, or Firm* — James C. Lydon

(57) ABSTRACT

Cradle for a passenger cabin of an aircraft, suitable for a child of less than 2 years old capable of sitting upright, comprising a rigid and formable structure formed by a rectangular frame and two uprights, designed to be fixed to one wall of the cabin, and a cover with mattress attached to the rectangular frame. The cover comprises in one of its longitudinal sides two windows separated by a strip of fabric and closed by a retractable tulle flap in such a way that the child can sit upright in the cradle with his or her legs passing out of the cradle through the windows and on either side of the fabric strip when the flap has been retracted.

7 Claims, 3 Drawing Sheets

CRADLE ADAPTABLE TO AN AIRCRAFT SEAT

TECHNICAL DOMAIN

The present invention concerns seats and cots suitable for children traveling in an aircraft, and in particular concerns a cradle adaptable to an aircraft seat.

STATE OF THE ART

At present, there are two categories of children traveling in an aircraft. Young children, such as babies, less than 6 months old, accompanied by their mothers, who benefit during long distance flights from cradles attached to the luggage lockers or to the vertical walls at the front of the aircraft, or on each of the walls separating passenger cabins. In contrast, children older than 2 years of age, who are generally accompanied, are invited to occupy a seat just like all the other passengers.

When a child's age ranges between 6 months and 2 years, that is when the child is at an age where s/he is capable of sitting upright, there are no provisions in the aircraft other than cradles for very young infants. Since these are long distance flights, it is impossible to request that a child of this age remain supine in the available cradle. In this case, the mother or the person accompanying the child has no other choice but to put the child on her or his lap in a sitting position, with all the fatigue and discomfort that is entailed for both the child and the person on whose lap the child is sitting.

BRIEF DESCRIPTION OF THE INVENTION

For this purpose, the invention is designed to supply a cradle for the passenger cabin of an aircraft, which may be adapted in view of allowing a child to sit upright.

The purpose of the invention is thus a cradle for the passenger cabin of an aircraft, suitable for a child of less than two years old, capable of sitting upright, comprising a rigid and foldable structure formed by a rectangular frame and two uprights, designed to be fixed to one wall of the cabin, and a cover with mattress attached to the rectangular frame. The cover comprises in one of its longitudinal sides two windows separated by a strip of fabric and closed by a retractable tulle flap in such a way that the child can sit upright in the cradle with his or her legs passing out of the cradle through the windows and on either side of the fabric strip when the flap has been retracted.

BRIEF DESCRIPTION OF THE FIGURES

The purposes, the objectives and the features of the invention shall appear more clearly upon consideration of the following description in reference to the drawings, in which.

DETAILED DESCRIPTION OF THE INVENTION

Figure 1:
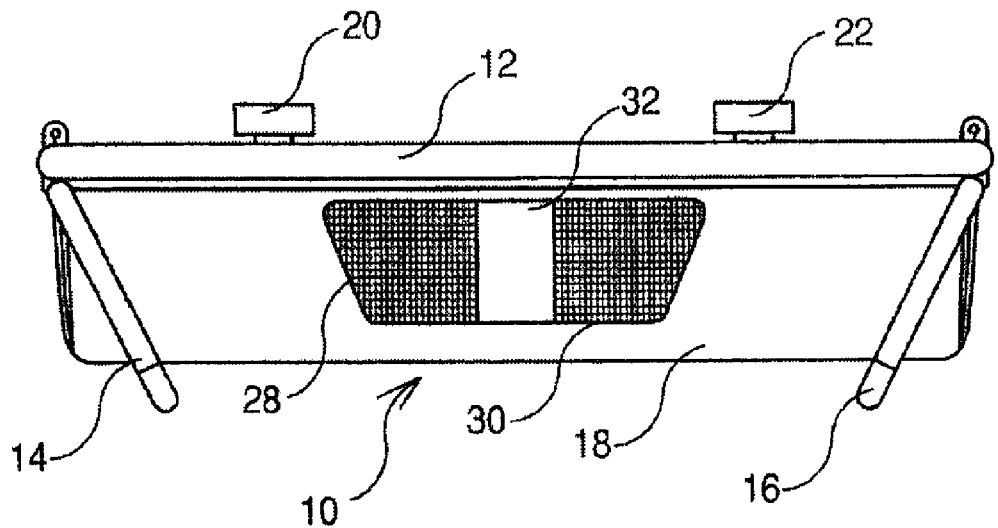
FIG. 1 represents a front view of the invention cradle attached to one of the airplane walls.
Figure 2:
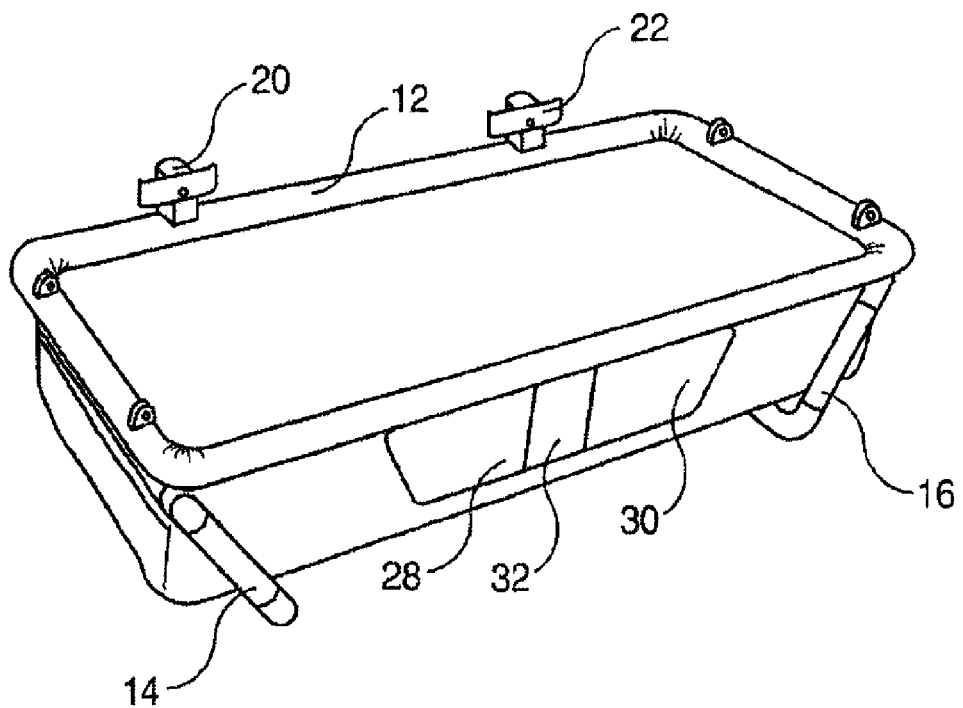
FIG. 2 represents a perspective view of the cradle represented in FIG. 1.

In reference to FIGS. 1 and 2, the crib 10 according to the invention, measuring between 70 cm and 80 cm in length, and between 35 cm and 40 cm in width, comprises a structure consisting of a rectangular frame 12 and two uprights 14 and 16, and a fabric cover 18 attached to the structure as it envelops the four parts of the rectangular frame 12. The two uprights 14 and 16 are slightly tilted inwards, and are thus easily folded when the cradle is not being used.

Figure 3:
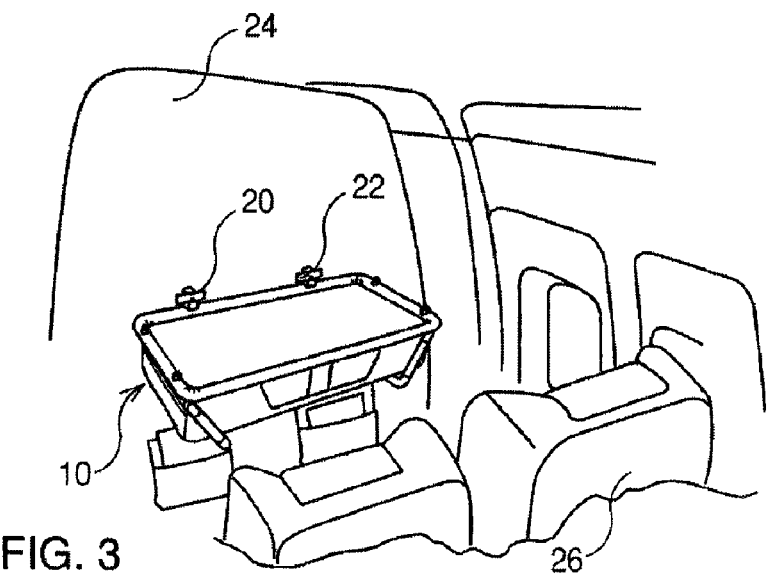
FIG. 3 represents a view from the inside of the cabin which shows the cradle attached to the wall in front of a row of seats.

Once mounted, the cradle 10 is attached to a vertical wall using two mounting brackets 20 and 22. As shown in FIG. 3, the wall 24 upon which the cradle is attached is preferably the wall located at the front of the passenger cabin, the mother or the person accompanying the child being seated on the seat 26 of the first row. To be noted that the wall 24 upon which the cradle is attached could be an altogether different vertical wall separating two passenger cabins, as for example the wall separating the business passenger cabin and the tourist passenger cabin.

As represented in FIGS. 1 and 2, the front longitudinal side of the cover consists of two windows 28 and 30, separated by a strip of fabric 32. As will be seen later, the two windows are used to enable each of the child's legs to pass through when sitting upright. To be noted that the two windows 28 and 30 do not extend all the way down to the bottom of the cover because there is a mattress about 3 cm thick that lines the bottom of the cover.

The two windows 28 and 30 are preferably in the shape of a trapeze, with the narrowest base of the trapeze at the lower end. Thus the child's legs are supported laterally while still being able to move.

Figure 4:
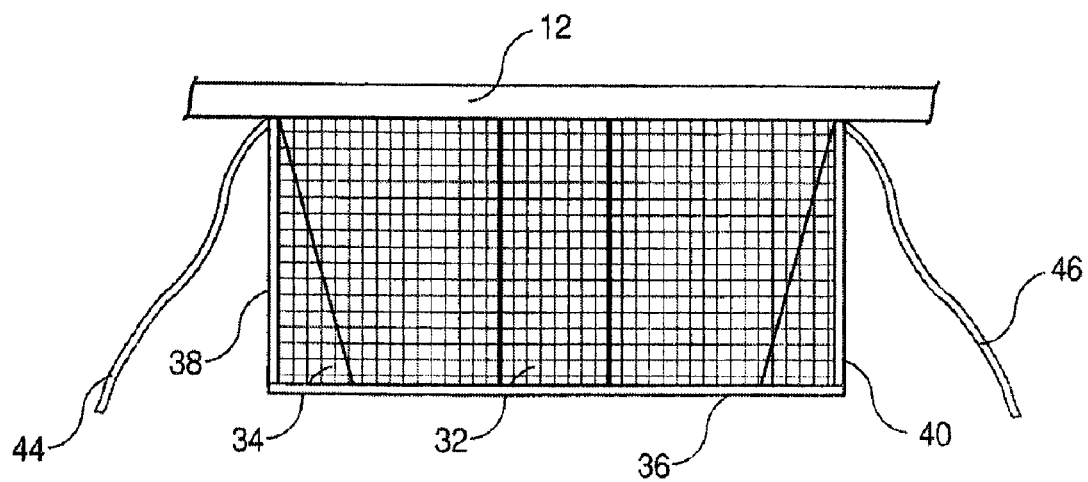
FIG. 4 represents a view from the inside of the cradle showing the two windows separated by a strip of fabric and the tulle flap in front of the windows.

When the infant is lying in the crib, a fabric flap or curtain is placed in front of the windows. As shown in FIG. 4, in which the windows are seen from the inside of the cradle, the fabric flap 34 is attached to the frame 12. The flap preferably has a rectangular shape, and the fabric is transparent, preferably tulle, which enables the mother of the child to watch her child lying in the crib, placed in her line of vision.

Figure 5:
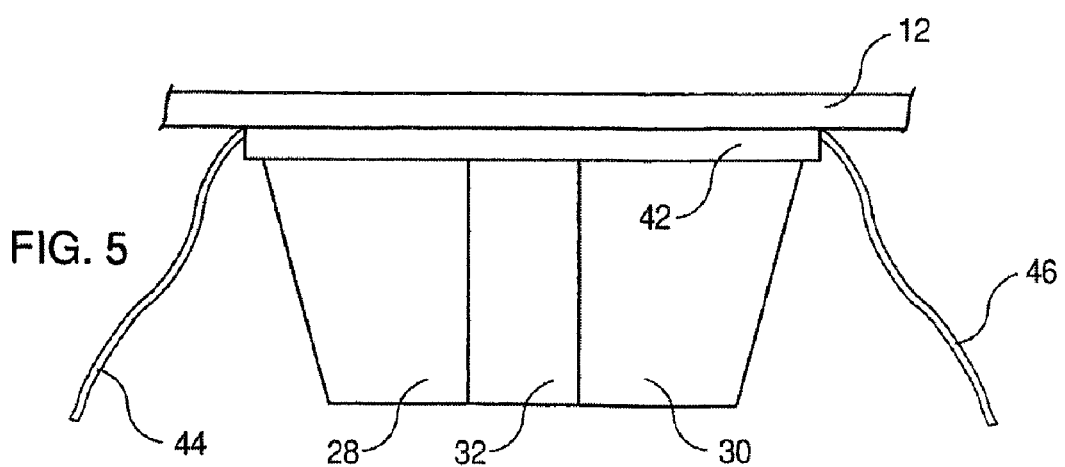
FIG. 5 represents said previous view with the tulle flap retracted in such a way that it allows the child to pass his or her legs through the windows.

The flap 34 comprises on the lower edge, and on the full length, piping 36, preferably of elastomeric material, with a diameter of about 2 cm. On each of the vertical sides, the flap comprises an auto-fastening strip 38 and 40, or a double-sided Velcro® hook and loop fastener strip, that is, with a "hook-side" on the front and a "loop-side" on the back, or vice versa. When the baby wants to be put in a sitting position, the flap is retracted as represented in FIG. 5. To this effect, the user grabs the piping 36 and rolls the flap around it, moving it upwards. As the flap is rolled up to clear the window openings, the double-sided auto-fastening strips 38 and 40 fasten together, since the back side hooks to the front loop side. When the flap is completely rolled up, it forms a cylinder 42 with a diameter of 3 to 5 cm. The cylinder, the core of which consists of the elastomeric material piping 36, is then positioned at chest-level of the child, when the latter is sitting upright. Thus, the body of the child is slightly pushed back, which prevents the child from toppling out of the cradle. To be noted that the cylinder 42 preventing the child from toppling forward could be an elastomeric cylinder, for example made of rubber, separate from the flap, and attached permanently to the frame 12.

Two straps 44 and 46 are attached to the frame 12. These restraining straps are designed to attach together behind the child's back when the latter is sitting upright so as to keep the child leaning forward against the elastic cylinder 42. Preferably, the straps 44 and 46 are auto-fastening strips of the Velcro® hook and loop fastener type, on at least each tip, with one of them "hook" on the outside, and the other "loop" on the inside, or vice versa.

Figure 6:
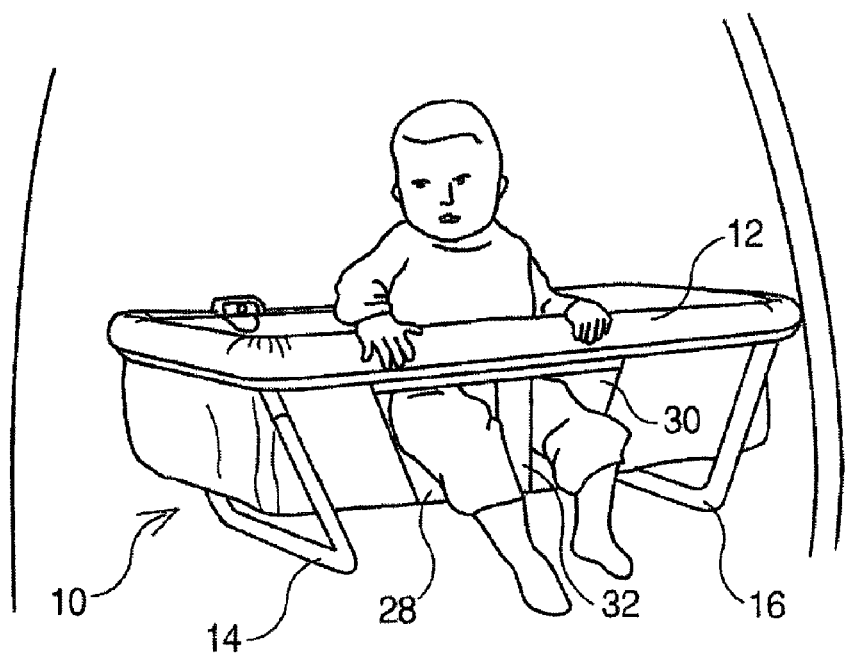
FIG. 6 represents a perspective view of the cradle where the child is seen sitting upright and from the front.
Figure 7:
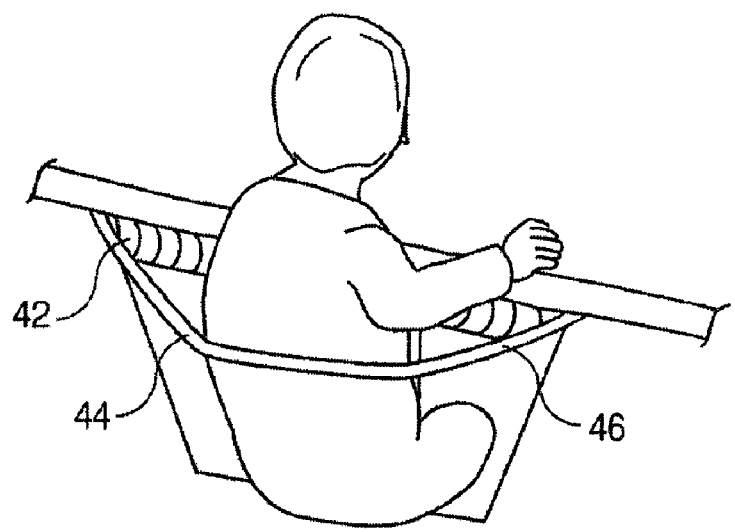
FIG. 7 represents the back of the child sitting upright in the cradle showing an elastomer cylinder in front of the child and restraining straps attached in the back.

When the child is sitting upright in the cradle, as illustrated in FIG. 6, the child is supported both in the front and in the back, comfortably seated without risks of falling out of the cradle. FIG. 7 shows the child sitting seen from the back. As illustrated in said figure, the child is supported in the front by the cylinder 42, the inside of which is of elastomeric material, and supported in the back by the straps 44 and 46 attached together in the back of the child.

Even though the invention was described above according to a preferred embodiment, other embodiments may be implemented without extending beyond the scope of the invention.

The invention claimed is:

1. A cradle for a passenger cabin of an aircraft, suitable for a child less than 2 years old capable of sitting upright, comprising a rigid and foldable structure formed by a rectangular frame and two uprights, designed to be fixed to one wall of the cabin, and a cover with mattress attached to the rectangular frame;

wherein said cover has two longitudinal sides and further comprises, in one of its longitudinal sides, two windows separated by a strip of fabric and closed by a retractable fabric flap in such a way that the child is able to sit upright in the cradle with his or her legs passing out of the cradle, through said windows, and on either side of the fabric strip, when the flap has been retracted.

2. The cradle of claim 1, further comprising an elastic cylinder, having a diameter of 3 to 5 cm, which is attached to said rectangular frame above said windows, said cylinder at chest-level of the child when the latter is sitting upright, slightly pushes back the child's body, thus preventing the child from toppling out of the cradle.

3. The cradle of claim 2, wherein said retractable flap has a rectangular shape having two vertical sides and top and bottom horizontal sides and comprises piping of rubber material at the bottom horizontal side, and comprises on each of the vertical sides a double-sided, auto-fastening strip, that is, with one "hook-side" on the front and one "loop-side" on the back or vice versa, so as to be able to roll said flap, around the piping, above said windows, while fastening together the inside and outside of the strips so as to obtain said cylinder that prevents the child from toppling out of the cradle.

4. The cradle of claim 3, wherein two straps attached to said rectangular frame are designed to fasten together in back of the child, when the latter is sitting upright, in view of supporting the child forwards against the elastic cylinder.

5. The cradle of claim 4, wherein said straps are auto-fastening strips on at least each of their tips, one of them being of the type "hook" on the outside, while the other is of the type "loop" on the inside, or conversely in view of fastening together in back of the child, when the latter is sitting upright.

6. The cradle of claim 1, wherein said windows are in the shape of a trapezoid, the narrowest base of the trapezoid at the lower end so that the legs of the child are supported laterally while still able to move.

7. The cradle of claim 1, wherein said flap is made of tulle, which allows the mother of the child to watch her child lying down in the cradle, placed within her line of vision.

\* \* \* \* \*